United States Patent
Xu et al.

(10) Patent No.: US 9,066,367 B2
(45) Date of Patent: Jun. 23, 2015

(54) MACRO-FEMTO INTER-CELL INTERFERENCE MITIGATION

(75) Inventors: Wen Xu, Neubiberg (DE); Ming Huang, Munich (DE)

(73) Assignee: INTEL MOBILE COMMUNICATIONS GMBH, Neubiberg (DE)

( * ) Notice: Subject to any disclaimer, the term of this patent is extended or adjusted under 35 U.S.C. 154(b) by 632 days.

(21) Appl. No.: 13/433,363

(22) Filed: Mar. 29, 2012

(65) Prior Publication Data

US 2013/0260744 A1 Oct. 3, 2013

(51) Int. Cl.
| | |
|---|---|
| H04W 4/00 | (2009.01) |
| H04W 36/00 | (2009.01) |
| H04W 40/00 | (2009.01) |
| H04W 68/00 | (2009.01) |
| H04B 7/00 | (2006.01) |
| H04L 12/66 | (2006.01) |
| H04L 12/28 | (2006.01) |
| H04W 88/02 | (2009.01) |
| H04W 24/02 | (2009.01) |
| H04L 25/02 | (2006.01) |
| H04B 1/10 | (2006.01) |
| H04W 16/16 | (2009.01) |
| H04W 84/04 | (2009.01) |

(52) U.S. Cl.
CPC .............. *H04W 88/02* (2013.01); *H04W 24/02* (2013.01); *H04L 25/0204* (2013.01); *H04L 25/0226* (2013.01); *H04L 25/023* (2013.01); *H04B 1/1036* (2013.01); *H04W 16/16* (2013.01); *H04W 84/045* (2013.01)

(58) Field of Classification Search
USPC .............. 455/434, 435.2, 436, 438, 439, 445, 455/458, 509, 515; 370/328, 331, 352, 401
See application file for complete search history.

(56) References Cited

PUBLICATIONS

Importance of Serving Cell Selection in Heterogeneous Networks; R1-010701 3GPP TSG-RAN WG1 #59 Jan. 18-22, 2010 Valencia, Spain Source: Qualcomm Incorporated.
Details of almost blank subframes; R1-105335 3GPP TSG-RAN WG1 #62bis Oct. 11-15, 2010 Xian, China Source:Ericsson, ST-Ericsson.
Enabling communication in harsh interference scenarios; R4-102673 3GPP TSG-RAN WG4 AH#10-03 Jun. 28-Jul. 2, 2010 Bratislava, Slovakia Source: Qualcomm Incorporated.

*Primary Examiner* — Mahendra Patel
*Assistant Examiner* — Natasha Cosme

(57) ABSTRACT

A method for managing signal interference is provided. The method comprising receiving a signal, wherein the signal comprises at least an interfering reference signal from an interfering network interface and a serving reference signal from a serving network interface, and wherein the interfering signal interferes with the serving signal; identifying a power level and offset of the interfering reference signal and a power level and offset of the serving reference signal; comparing the interfering power level and offset to the serving power level and offset to form a comparison; and performing a corrective action based on the comparison.

18 Claims, 10 Drawing Sheets

MACRO-FEMTO INTER-CELL INTERFERENCE MITIGATION

FIELD

Embodiments relate generally to systems and methods for managing interference with user equipment.

BACKGROUND

In LTE-A (Long term evolution advanced) or LTE Rel. 10+, heterogeneous net-work deployments are supported. In a heterogeneous network, a macrocell provides basic coverage, complemented by multiple low-power pico-/femtocells where needed. Such deployments give scenarios of macro-pico/femto inter-cell interferences.

In different LTE releases, the inter-cell interference coordination (ICIC) mechanism may be used. In ICIC, the goal is to determine the resources (frequency, time and power) available in each cell, and schedule those resources to users such that the inter-cell interference can be avoided or reduced.

In a heterogeneous network (HetNet), base stations (BSs) or evolved Node Bs (eNBs) in terms of 3GPP (3rd Generation Partnership Project) LTE of pico-/femtocells can be operator-deployed or user-deployed. In the operator-deployed case, users of a macrocell are usually allowed to connect to the pico-/femtocell. This is known as open access. And in the user-deployed case, home BSs, femto, or Home eNBs (HeNBs) are installed by the users. Such low-power BSs are typically limited to a small set of user equipment (UE) (e.g. family members) which is called the closed subscriber group (CSG). A UE is usually not allowed to connect to the CSG if it does not have the access code. In this scenario, a non-CSG UE staying in close proximity to the CSG may be subject to strong interference from the HeNB and may not be able to access the macrocell at all.

In order to deal with these harsh interference problems, the so-called enhanced inter-cell interference coordination (eICIC) has been introduced, and the further eICIC (FeICIC) may be used as well. By using almost blank subframes (ABSs), the eICIC can schedule the frequency or time resource for macrocell and pico-/femtocell to avoid the interference.

Additionally, there is another scenario in which a pico-/femtocell UE is interfered by a strong macrocell. This setup occurs when it is preferable to have a UE connect to a low-power pico-/femtocell node even when it has significantly lower received power as compared to a high-power macro node. This setup may be useful when, for example, the strong cell has weak backhaul quality, or when it is desirable to enable traffic off-loading to the low-power nodes and to achieve true cell-splitting gains in the network. Especially in such HetNet situations, ICIC may not be fully effective in mitigating the inter-cell interference.

As ABSs still contain the cell-specific reference signals (CRSs), paging channel (PCH), physical broadcast channel (PBCH), and primary and secondary synchronization channels (PSS/SSS), etc, interference to the transmission at these positions cannot be avoided. Especially due to the large amount of CRSs distributed throughout the overall user bandwidth, which are primarily used for channel estimation, the impact of the interfering CRSs can be quite large. When the CRSs from both cells have different offset, the channel estimation is not affected by the interferer, but the interfering CRSs will wipe out some data tones. In this situation, muting of the interfered data tones is one solution for this problem. When CRSs from both cells have the same or similar offset, they will collide with each other. Based on the colliding CRSs, channel estimation accuracy will degrade severely and the demodulation performance suffers accordingly.

BRIEF SUMMARY

In accordance with an illustrative embodiment, a method for managing signal interference is provided. The method comprising receiving a signal, wherein the signal comprises at least an interfering reference signal from an interfering network interface and a serving reference signal from a serving network interface, and wherein the interfering signal interferes with the serving signal; identifying a power level and/or offset of the interfering reference signal and a power level and/or offset of the serving reference signal; comparing the interfering power level and/or offset to the serving power level and/or offset to form a comparison; and performing a corrective action based on the comparison.

In accordance with an illustrative embodiment, a method is provided for managing signal interference. The method comprises identifying a plurality of symbols in a demodulated data signal. The plurality of symbols are at least one or more symbols apart. The method also comprises estimating a channel of the demodulated data signal using the plurality of symbols.

In accordance with an illustrative embodiment, a user equipment is provided. The user equipment comprises a receiver and a detector module. The receiver may be configured to receive a reference signal, the reference signal comprising at least an interfering reference signal from an interfering network interface and a serving reference signal from a serving network interface, and the interfering reference signal interferes with the serving reference signal. The detector module may be configured to identify a power level and offset of the interfering reference signal and a power level and offset of the serving reference signal and compare the interfering power level and offset to the serving power level and offset.

BRIEF DESCRIPTION

Embodiments will be explained in more detail in the following text, and are illustrated in the figures, in which.

DETAILED DESCRIPTION

Figure 1:
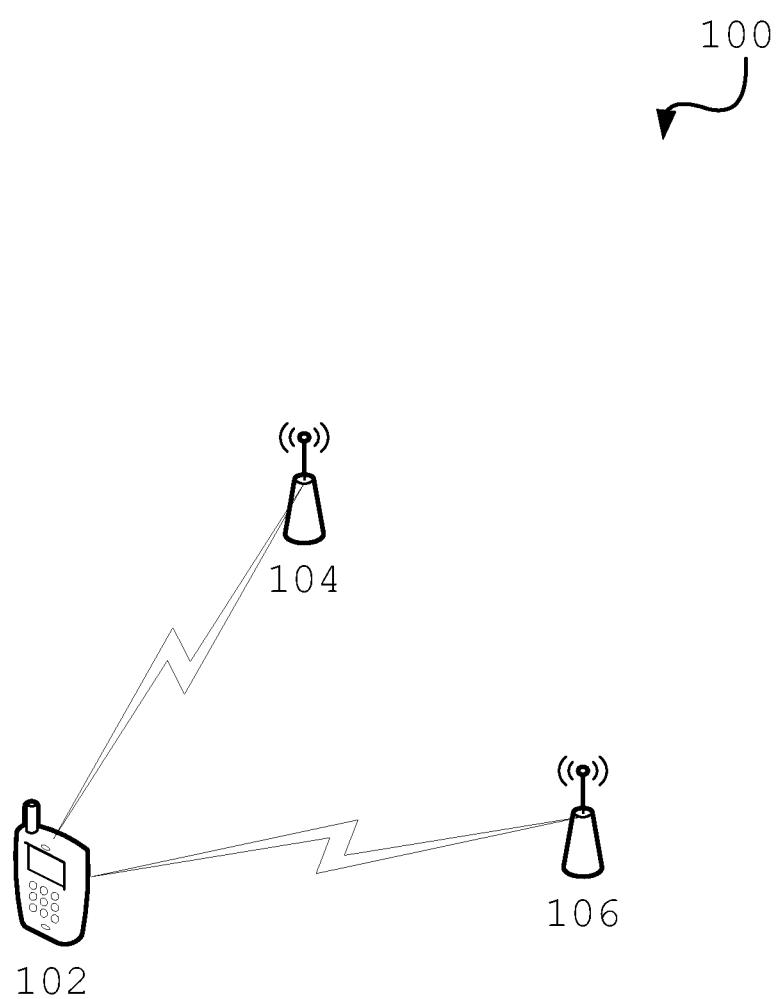
FIG. 1 shows a communication system in accordance with an illustrative embodiment.

The following detailed description refers to the accompanying drawings that show, by way of illustration, specific details and embodiments in which the invention may be practiced. The word "exemplary" is used herein to mean "serving as an example, instance, or illustration". Any embodiment or design described herein as "exemplary" is not necessarily to be construed as preferred or advantageous over other embodiments or designs.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Note that in this Specification, references to "a number of" may mean one or more. For example, a number of objects may be one object, ten objects, fifty objects, or any number of objects. Also note that in this Specification, references to "at least one of" may mean any combination. For example, at least one of object A and object B may be object A, object B, or both objects A and B.

Although the description is illustrated and described herein with reference to certain embodiments, the description is not intended to be limited to the details shown. Modifications may be made in the details within the scope and range equivalents of the claims.

One or more embodiments provide a received-power (e.g. RSRP—reference signal received power in 3GPP LTE) and/or offset dependent interference cancellation (IC) scheme. This scheme selects the direct IC, joint channel detection IC, or no IC according to measured RSRP and/or offset. For strong interfering cell RSRP, the direct IC may be used as estimation of interfering cell channel directly, and cancel the interfering signal accordingly. For roughly equal RSRP of both cells, joint channel detection IC may be used. For strong serving cell RSRP, the conventional channel estimation without IC may be used. Alternatively, in another embodiment, any combination of schemes may be used for any of the scenarios. One or more embodiments recognize that this scheme is simple and can provide accurate channel estimation for full signal to interference plus noise ratio (SINR) range.

One or more embodiments provide a virtual cell-specific reference signal (virtual CRS) based decision-directed channel estimation. This method may use the channel estimate of previous orthogonal frequency-division multiplexing (OFDM) symbols for current data detection. As it uses the eICIC feature (transmission of ABS), the effect of colliding CRSs may be bypassed. In an embodiment, only specific detected data (called the virtual CRSs) are selected for channel estimation according to the CRS pattern in every two OFDM symbols.

One or more embodiments recognize that this process bypasses the effect of colliding. Also, there is enough data without interference available for channel estimation. By making use of the virtual CRS pattern, the computational complexity can be kept low.

One or more embodiments provide and IC-assisted decision-directed channel estimation. This method may be a combination of the received-power dependent IC scheme and virtual CRS based decision-directed channel estimation scheme as discussed above. The decision-directed channel estimation is performed by using the detected data obtained by the RSRP-dependent IC. One or more embodiments recognize that this process provides a high performance due to further enhancement of the RSRP-dependent IC. This process also provides improved decision-directed channel estimation in time-varying channel.

FIG. 1 shows a communication system in accordance with an illustrative embodiment.

In an embodiment, communication system 100 may include suitable interfaces for receiving, transmitting, and/or otherwise communicating data or information in a network environment. Such network interfaces may be inclusive of multiple wireless technologies, for example, WiFi, WiMax, 3G, 4G, white space, 802.11x, satellite, Bluetooth, near field communication, LTE, GSM/WCDMA/HSPA, CDMA1x/EVDO, DSRC, CAN, GPS, etc.

Communication system 100 may be a heterogeneous network (HetNet). A HetNet may indicate the use of multiple types of access nodes (network interfaces) in a wireless network. A Wide Area Network can use macrocells, picocells, and/or femtocells in order to offer wireless coverage in an environment with a wide variety of wireless coverage zones, ranging from an open outdoor environment to office buildings, homes, and underground areas. A HetNet may be a network with complex interoperation between macrocell, small cell, and in some cases WiFi network elements used together to provide a mosaic of coverage, with handoff capability between network elements.

Communication system 100 may include user equipment 102 and network interfaces 104 and 106. In other embodiments, communication system 100 may include more or less base stations and user equipment devices. In an embodiment, network interfaces 104 and 106 may be base stations. The base stations may be eNBs (evolved Node Bs) in terms of 3GPP LTE of pico-/femtocells can be operator-deployed or user-deployed.

User equipment 102 may be referred to as a communication terminal or mobile device. User equipment 102 may include network interfaces for receiving, transmitting, and/or otherwise communicating data or information. User equipment 102 can be a hand-held mobile phone, a laptop computer equipped with a mobile broadband adapter, or any other device capable of communicating with base stations 104 and 106.

Even though it appears in FIG. 1 that user equipment 102 is connected with both of network interfaces 104 and 106, it is understood that user equipment 102 may be connected with any number of the network interfaces at any time.

Figure 2:
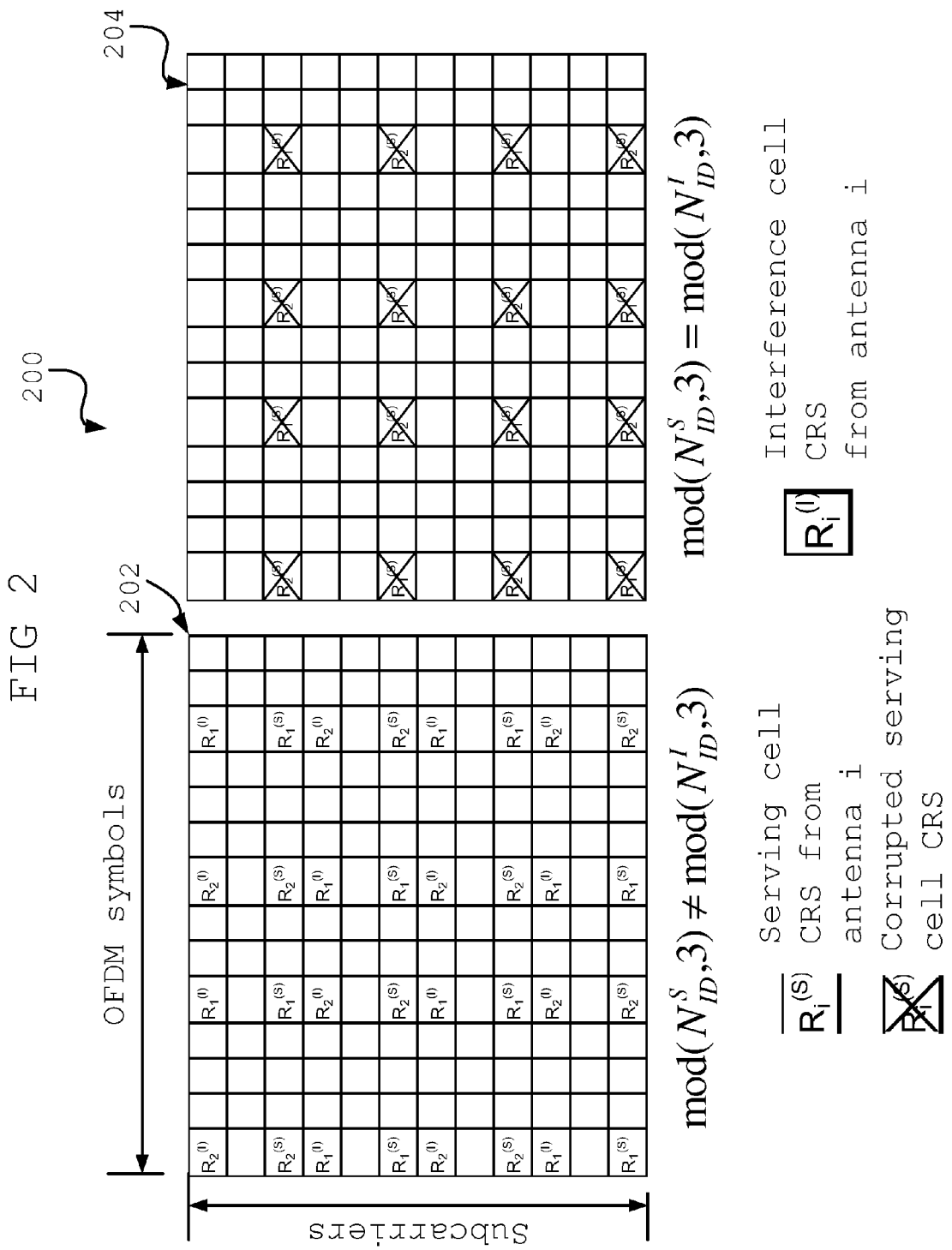
FIG. 2 shows a set of time-frequency resource grids in accordance with an illustrative embodiment.

FIG. 2 shows a set of time-frequency resource grids in accordance with an illustrative embodiment.

The time-frequency resource grids 202 and 204 may be examples of time-frequency resource grids of user equipment in a 2×2 MIMO (multiple-input and multiple-output) communication system. The 2×2 MIMO system may be one example of communication system 100 as shown in FIG. 1. As CRSs are distributed over the whole time-frequency resource grid of users, they may collide.

The different embodiments in this disclosure provide devices and methods of reducing the impact of the colliding cell-specific resource signals (CRSs). As CRSs are primarily used for channel estimation, their collision will reduce the channel estimation accuracy, which inevitably leads to degradation of the system performance.

In an embodiment, resource grids 202 and 204 show the co-existence of CRSs of the serving cell and interfering cell, where $N_{ID}^S$ and $N_{ID}^I$ denote the serving cell ID (identity) and interfering cell ID, respectively.

When CRSs of the serving cell and interfering cell have different position offset and do not collide, such as in resource grid 202, the channel estimation using the serving cell CRSs is not affected by the interfering cell CRSs since, in the almost blank subframes (ABSs), the interfering cell does not transmit user data. Any interfering CRSs may wipe out some data tones. To reduce this impact, these data tones can, for example, be properly muted. As such, the UE performance will not degrade significantly as long as the channel estimation for the serving cell is accurate.

However, when CRSs of both serving and interfering cells collide with each other, such as in resource grid 204, the interfering cell CRSs will distort the serving cell CRSs. Based on the colliding CRSs, channel estimation accuracy will degrade, and consequently the data demodulation performance suffers accordingly.

The different embodiments recognize and take into account the current solutions, for example, use a subframe shift to avoid such collision. But subframe shift cannot be applied to a time division duplex (TDD) long term evolution (LTE) system. Another current solution is to configure the interfering ABSs to be multi-media broadcast over a single frequency network (MBSFN) subframes. Unfortunately, MBSFN subframes are not always configurable.

Figure 3:
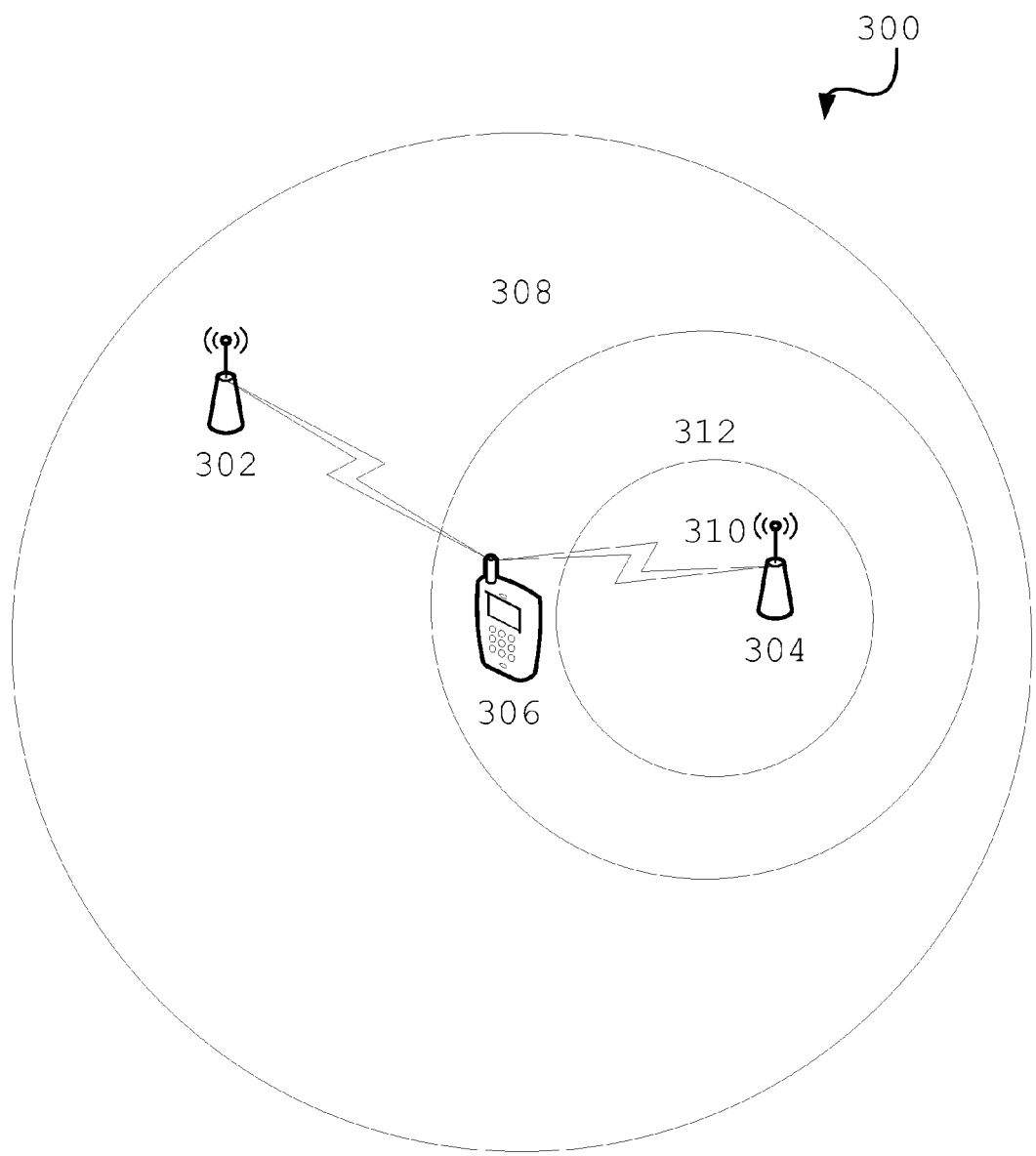
FIG. 3 shows a communication system in accordance with an illustrative embodiment.

FIG. 3 shows a communication system in accordance with an illustrative embodiment. Communication system 300 may be one example of communication system 100 as shown in FIG. 1.

In an embodiment, communication system 300 may include a network with network interfaces for receiving, transmitting, and/or otherwise communicating data or information in a network environment. Communication system 2300 may also include user equipment 306.

User equipment 306 may be a network interface capable of receiving, transmitting, and/or otherwise communicating data or information with network interfaces. In an embodiment, user equipment 306 may be any mobile or non-mobile device. An example of user equipment 306 may be a smart phone, mobile phone, laptop, tablet personal computer, surveillance camera, or other type of suitable device.

In an embodiment, the network may be a cellular network, wireless local area network, another type of wireless network, or a combination thereof. The network may include network interfaces such as macrocell 302 and femtocell 304. Macrocell 302 and femtocell 304 are capable of receiving, transmitting, and/or otherwise communicating data or information with user equipment 306. Macrocell 302 and femtocell 304 may include a plurality of base stations and wireless access points. In an embodiment, Macrocell 302 and femtocell 304 may also include other devices.

Macrocell 302 may be a cell in a mobile phone network that provides radio coverage served by a high power cellular base station (tower). The term macrocell has cell range 308. Cell range 308 may be the widest range of cell sizes.

Femtocell 304 may be a small cellular base station, typically designed for use in a home or small business. It connects to the network of a service provider via broadband (such as DSL or cable). Femtocell 304 may have interior cell range 310 and signal strength border 312. Interior cell range 310 may be a stronger signal than signal strength border 312.

In communication system 300, user equipment 306 is covered in both cell range 310 and signal strength border 312. Depending on the strength of the signals from macrocell 302 and femtocell 304, one of the base stations may interfere with the other. For example, if user equipment 306 is connected to macrocell 302, a stronger signal from femtocell 304 may interfere with the signal coming from macrocell 302. User equipment 306 may be prevented from switching to femtocell 304 in this case if femtocell 304 is a closed subscriber group.

In another embodiment, communication system 200 may also include a picocell. A picocell may be a small cellular basestation typically covering a small area, such as in-building (offices, shopping malls, train stations, stock exchanges, etc.), or more recently in-aircraft. In cellular networks, picocells are typically used to extend coverage to indoor areas where outdoor signals do not reach well, or to add network capacity in areas with very dense phone usage, such as train stations.

In communication system 300, the cell that user equipment 306 is connected to is the serving cell, such as macrocell 302, and the cell that is interfering may be referred to as the interfering cell, such as femtocell 304. In a macrocell, femtocell, or picocell environment where the serving cell is interfered by one dominant interfering cell, the received downlink signal of user equipment 206 at signal strength border 312 is the sum of the desired signal from the serving cell and the interfering signal from the interfering cell. In the frequency domain, H denotes the channel coefficient, X denotes the transmitted signal, Z is the additive white Gaussian noise (AWGN). Accordingly, the received signal "Y" of the "m" OFDM symbol at the "k" subcarrier can be written as $$Y_m(k) = H_m^{(S)}(k) X_m^{(S)}(k) + H_m^{(I)}(k) X_m^{(I)}(k) + Z_m^{(k)} \quad (1)$$

where superscript "I" and "S" denote the interfering and serving cell, respectively. In the following portions of this disclosure, subcarrier index "k" may be omitted for simplicity.

Since cell IDs (identities), offset, and reference signal received power (RSRP) of both cells are known after cell search, the power and positions of CRSs are available for the UE. We denote the RSRP of the serving cell and interfering cell as $P_{(S)}$ and $P^{(I)}$, respectively.

It can be shown that the normalized mean square error (NMSE) of the minimum mean square error (MMSE) estimate of the serving cell channel based on the interfered CRSs becomes $$NMSE_{nolC} = NMSE_0 + \frac{P^{(I)}}{P^{(S)}} tr\{W^{(S)} R^{(I)} (W^{(S)})^H\} \quad (2)$$

where $NMSE_0$ denotes the normalized mean square error (NMSE) of the MMSE channel estimate when no inter-cell interference is present. $W^{(S)}$ denotes the Wiener filter for the serving cell channel and $R^{(I)}$ is the correlation matrix of the interfering cell channel. Throughout this disclosure, matrices and the vectors may be denoted with boldface letters. Also, in this disclosure, $(.)^H$ denotes conjugate-transpose and $E\{.\}$ denotes expected value. The NMSE increases as the power of the interfering cell $P^{(I)}$ increases.

Figure 4:
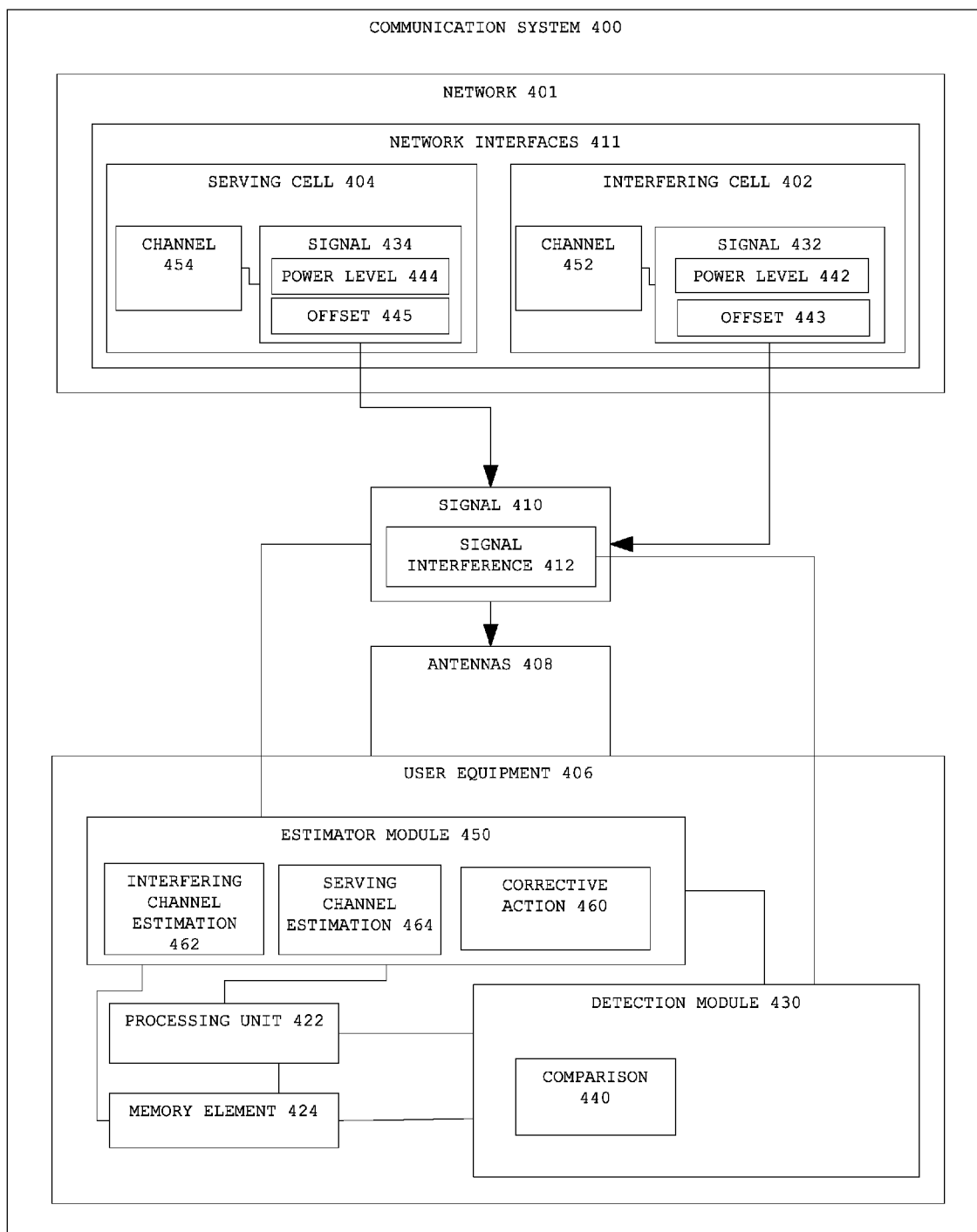
FIG. 4 shows a communication system in accordance with an illustrative embodiment.

FIG. 4 shows a communication system in accordance with an illustrative embodiment. Communication system 400 may be one example of communication system 100 as shown in FIG. 1.

In an embodiment, communication system 400 may include network 401 and user equipment 406.

In different embodiments, user equipment 406 may be any type of network interface capable of transmitting or receiving a wireless signal or radio signal. For example, user equipment 406 may be a laptop, mobile phone, user equipment, smart phone, automobile, machine-to-machine (M2M) device, stationary devices, or other suitable device.

User equipment 406 may include antennas 508, estimator module 520, detection module 572, processing unit 522, and memory element 524.

Antennas 508 may be configured to send and receive a plurality of signals, such as signal 510, on different radio frequency technologies. For example, antennas 506, 508 may operate with WiFi, WiMax, 3G, 4G, white space, 802.11x, satellite, Bluetooth, near field communication, LTE, GSM/WCDMA/HSPA, CDMA1x/EVDO, DSRC, CAN, GPS, etc. In other embodiments, user equipment 406 may have more or less antennas and the antennas may be configured to communicate with other wireless technologies. Antenna 508 may be connected to a transceiver which operates antenna 508.

In an embodiment, network 401 includes network interfaces 411. Network interfaces 411 include serving cell 404 and interfering cell 402. Each cell 402 and 404 may transmit a signal that may be received by user equipment 406. Serving cell 404 may be the cell that is connected to user equipment 406. Serving cell 404 may transmit signal 434. Interfering cell 402 may transmit signal 432.

Signals 432 and 434 may be combined when they are received by antennnas 408 to form signal 410. Signals 432 and 434 may be reference signals or data signals. Furthermore, signal 410 may be a reference signal or data signal or a combination.

Each signal has a power level. If power level 442 of signal 432 is near or greater than power level 444 of signal 434, then signal 432 may cause signal interference 412 with signal 434.

Each signal may also have an offset. Signal 432 may have offset 443 and signal 434 may have offset 445. In an embodiment, if offset 443 and offset 445 are within a threshold number of symbols from each other, signals 432 and 434 may collide. The offsets may be frequency offsets. For example, each offset may be an indication of subcarrier frequency used.

In an embodiment, user equipment has detection module 430. Detection module 430 may be configured to detect signal interference 412 in signal 410. Detection module 430 may perform comparison 440 of power levels 442 and 444 and/or offsets. Signals 432 and 434 may be reference signals. Also, power levels 442 and 444 may be reference signal received power levels. If detection module 430 detects that power level 442 from interfering cell 402 is greater than power level 444 of serving cell 404 by a threshold difference and the offset is within a threshold number of symbols (i.e. a collision occurs), then there may be signal interference 412 in signal 410.

A threshold number of symbols for the offset may be one symbol. In another embodiment, the threshold may be two, three, or more symbols. In yet another embodiment, the threshold number of symbols may be less than one symbol.

The threshold difference may be any power level. For example, in an embodiment, the threshold difference may be 3 dB. In another embodiment, if power level 442 from interfering cell 402 is near power level 444 of serving cell 404 by a threshold difference, then there may be signal interference 412 in signal 410. For example, in an embodiment, if power level 442 is within 3 dB of power level 444 then there may be signal interference 412 of signal 410.

User equipment 406 includes estimator module 450. Estimator module 450 may estimate channels 452 and 454 of cells 402 and 404, respectively. Estimator module 450 may perform interfering channel estimation 462 and/or serving channel estimation 464. The techniques used to make the estimation are described in this disclosure.

Estimator module 450 also includes correction action 460. Corrective action 460 may be the type of corrective action taken by user equipment 406 to reduce signal interference. Different types of corrective actions are described in this disclosure.

In an embodiment, user equipment 406 may include one or more memory elements 424 for storing information to be used in achieving operations associated with applications management, as outlined herein. For example, a policy may be stored in memory element 424 for optimizing signal interference management in communication system 400.

These devices may further keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information in communication system 400 could be provided in any database, register, table, cache, queue, control list, or storage structure, based on particular needs and implementations, all of which could be referenced in any suitable timeframe. Any of the memory or storage items discussed herein should be construed as being encompassed within the broad term 'memory element' as used herein in this disclosure.

In example embodiments, the operations for managing signal interference outlined herein may be implemented by logic encoded in one or more tangible media, which may be inclusive of non-transitory media (e.g., embedded logic provided in an application-specific integrated circuit (ASIC), digital signal processor (DSP) instructions, software potentially inclusive of object code and source code to be executed by a processor or other similar machine, etc.). In some of these instances, one or more memory elements 424 can store data used for the operations described herein. This includes the memory elements being able to store software, logic, code, or processor instructions that are executed to carry out the activities described in this disclosure.

Additionally, processing unit 422 may execute any type of instructions associated with the data to achieve the operations detailed herein in this disclosure. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Processing unit 422 may be a number of processors, a multi-processor core, a shared processor, or some other type of processor, depending on the particular implementation. A number, as used herein with reference to an item, means one or more items. Further, processing unit 422 may be implemented using a number of heterogeneous processor systems in which a main processor is present with secondary processors on a single chip. As another illustrative example, processing unit 422 may be a symmetric multi-processor system containing multiple processors of the same type.

The illustration of communication system 400 in FIG. 4 is not meant to imply physical or architectural limitations to the manner in which an aspect of this disclosure may be implemented. Other components in addition and/or in place of the ones illustrated may be used. Some components may be unnecessary in an aspect of this disclosure. For example, processing unit 422 may be located within detection module 430.

When a UE is close to the interference source, $P^{(I)}$ will be much stronger than $P^{(S)}$, e.g. $P^{(I)} - P^{(S)} > 3$ dB. In this case, we can simply treat the desired signal plus noise $H_m^{(S)} X_m^{(S)} + Z_m$ as noise. Then, the interfering cell channel $H^{(I)}$ can be estimated. For example, its least square (LS) channel estimate is given by $$\hat{H}_{m,LS}^{(I)} = Y_m (X_m^{(I)})^{-1} \qquad (3)$$

$$= H_m^{(I)} + H_m^{(S)} X^{(S)} (X_m^{(I)})^{-1} + Z_m (X_m^{(I)})^{-1}.$$

With the LS channel estimate available, a Wiener filter can be applied to remove the unwanted noise. The resulting MMSE channel estimate $\hat{H}_{m,MMSE}^{(I)}$ can then be used to cancel the interference. Consequently, the desired signal from the serving cell becomes $$\hat{Y}_m^{(S)} = Y_m - \hat{H}_{m,MMSE}^{(I)} X_m^{(I)}. \qquad (4)$$

When a UE receives roughly equal power level from the interfering cell and serving cell, e.g. $|P^{(I)} - P^{(S)}| < 3$ dB, both signals are significant and cannot be considered as noise. In this case, we can use a joint detection algorithm to estimate both serving cell channel and interfering cell channel at the same time.

Consider a 2×2 MIMO system as an example (The extension to 4×2, 4×4, etc. is similar). In absence of noise, the received signals are given by $$\begin{bmatrix} Y_{m,1} \\ Y_{m,2} \end{bmatrix} = \begin{bmatrix} H_{m,11}^{(S)} & H_{m,12}^{(S)} \\ H_{m,21}^{(S)} & H_{m,22}^{(S)} \end{bmatrix} \begin{bmatrix} X_{m,1}^{(S)} \\ X_{m,2}^{(S)} \end{bmatrix} + \begin{bmatrix} H_{m,11}^{(I)} & H_{m,12}^{(I)} \\ H_{m,21}^{(I)} & H_{m,22}^{(I)} \end{bmatrix} \begin{bmatrix} X_{m,1}^{(I)} \\ X_{m,2}^{(I)} \end{bmatrix} \qquad (5)$$

where the subscript 1 and 2 denote the indices of transmitter antennas. Note that both antennas of a BS are not transmitting CRSs at the same time, which means $X_{m,1}^{(\cdot)} = 0$ or $X_{m,2}^{(\cdot)} = 0$. When transmitter antenna 1 is on, formula (5) can be simplified to $$\begin{bmatrix} Y_{m,1} \\ Y_{m,2} \end{bmatrix} = \begin{bmatrix} H_{m,11}^{(S)} & H_{m,11}^{(I)} \\ H_{m,21}^{(S)} & H_{m,21}^{(I)} \end{bmatrix} \begin{bmatrix} X_{m,1}^{(S)} \\ X_{m,1}^{(I)} \end{bmatrix}. \qquad (6)$$

There may be four unknown channel parameters $H_{11}^{(S)}$, $H_{11}^{(I)}$, $H_{21}^{(S)}$, $H_{21}^{(I)}$, while only two equations are available. It means that using one CRS symbol is not sufficient to estimate the channel. In LTE, channel usually remains invariant within a resource block, especially when the Doppler spread is small, i.e. $H_m = H_{m-1}$. We can therefore consider more than one CRS symbol. E.g. when two consecutive CRS symbols are available, we have $$\begin{bmatrix} Y_{m,1} & Y_{m-1,1} \\ Y_{m,2} & Y_{m-1,2} \end{bmatrix} = \begin{bmatrix} H_{11}^{(S)} & H_{11}^{(I)} \\ H_{21}^{(S)} & H_{21}^{(I)} \end{bmatrix} \begin{bmatrix} X_{m,1}^{(S)} & X_{m-1,1}^{(S)} \\ X_{m,1}^{(I)} & X_{m-1,1}^{(I)} \end{bmatrix}. \qquad (7)$$

And perform the pseudo inverse on the right-hand side X matrix, we can obtain the channel coefficients $$\begin{bmatrix} H_{11}^{(S)} & H_{11}^{(I)} \\ H_{21}^{(S)} & H_{21}^{(I)} \end{bmatrix} = \begin{bmatrix} Y_{m,1} & Y_{m-1,1} \\ Y_{m,2} & Y_{m-1,2} \end{bmatrix} \begin{bmatrix} X_{m,1}^{(S)} & X_{m-1,1}^{(S)} \\ X_{m,1}^{(I)} & X_{m-1,1}^{(I)} \end{bmatrix}^{+}. \qquad (8)$$

Generation of the above method to more CRS symbols is straightforward. Following the same approach, we can estimate both serving cell channel $\hat{H}^{(S)}$ and interfering cell channel $\hat{H}^{(I)}$ at CRS positions. Note that the joint detection is actually an LS algorithm. Thus, Wiener filtering on $\hat{H}^{(I)}$ can be applied to improve the accuracy. Based on the filtered channel $\hat{H}_{MMSE}^{(I)}$, interference cancellation can then be performed using Eq. (4).

By combining the direct IC for, say $P^{(I)} - P^{(S)} > 3$ dB, the joint channel detection IC for, say $-3 \leq P^{(S)} - P^{(I)} \leq 15$ dB, and no IC for $P^{(S)} - P^{(I)} > 15$ dB, we obtain a received-power dependent IC scheme which is here referred to as the combined IC ('comIC'). Notice that alternative parameters other than RSRP may also be used to select proper IC schemes.

Figure 5:
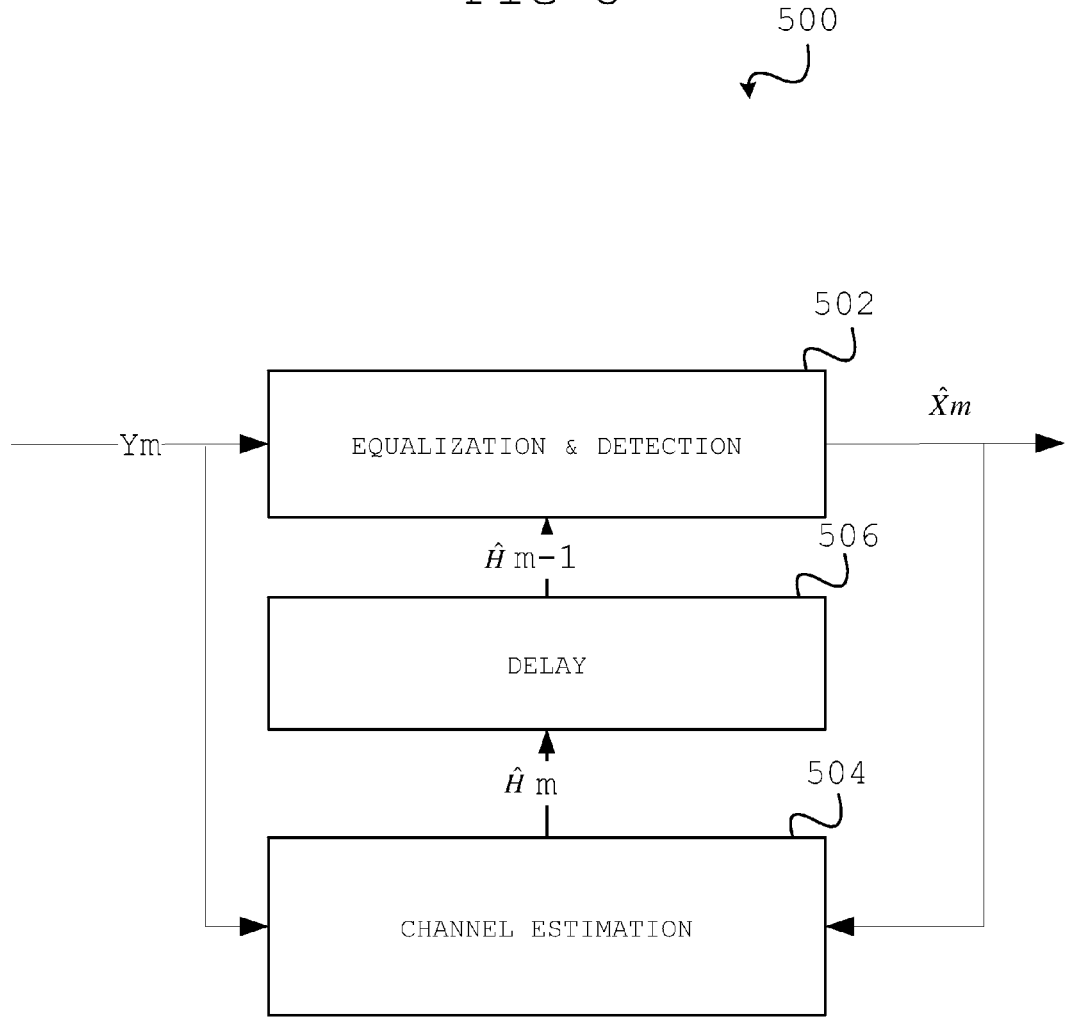
FIG. 5 is a flowchart for a decision directed channel estimation in accordance with an illustrative embodiment.

FIG. 5 is a flowchart for a decision directed channel estimation in accordance with an illustrative embodiment. Process 500 may be used in a communication system, such as communication system 100 as shown in FIG. 1.

When eICIC is activated, the serving cell transmits data over the ABSs of the interfering cell, which indicates that the data transmission of the serving cell is not affected by the interfering cell, even when CRSs of the serving and interfering cells collide.

Decision directed channel estimation (DDCE) uses the channel estimate of a previous OFDM symbol for data detection of the current OFDM symbol (step 502). Then, use the newly detected data to estimate the current channel (step 504). Take a 2×2 MIMO system as an example, the received signal is given as $$\begin{bmatrix} Y_{m,1} \\ Y_{m,2} \end{bmatrix} = \begin{bmatrix} H_{11} & H_{12} \\ H_{21} & H_{22} \end{bmatrix} \begin{bmatrix} X_{m,1} \\ X_{m,2} \end{bmatrix}. \qquad (9)$$

Here, $H_{ij}$ denotes channel coefficient of "j" transmit antenna to "i" receive antenna; $X_{m,j}$ denotes transmitted signal from "j" transmit antenna; $Y_{m,i}$ denotes received signal from "i" receive antenna. Since four channel coefficients cannot be solved using one observed OFDM symbol, we further assume the channel remains the same for more than one symbol (step 506). For instance, combining equations for two successive symbols results in $$\begin{bmatrix} Y_{m,1} & Y_{m-1,1} \\ Y_{m,2} & Y_{m-1,2} \end{bmatrix} = \begin{bmatrix} H_{11} & H_{12} \\ H_{21} & H_{22} \end{bmatrix} \begin{bmatrix} X_{m,1} & X_{m-1,1} \\ X_{m,2} & X_{m-1,2} \end{bmatrix}. \qquad (10)$$

Then the channel can be estimated as $$\begin{bmatrix} H_{11} & H_{12} \\ H_{21} & H_{22} \end{bmatrix} = \begin{bmatrix} Y_{m,1} & Y_{m-1,1} \\ Y_{m,2} & Y_{m-1,2} \end{bmatrix} \begin{bmatrix} X_{m,1} & X_{m-1,1} \\ X_{m,2} & X_{m-1,2} \end{bmatrix}^{+}. \qquad (11)$$

As it is a least squares channel estimate, Wiener filtering can then be performed on the obtained channel matrix to obtain MMSE estimate. Again, extensions to 4×2, 4×4, etc., and to more than two CRS symbols are straightforward.

Figure 6:
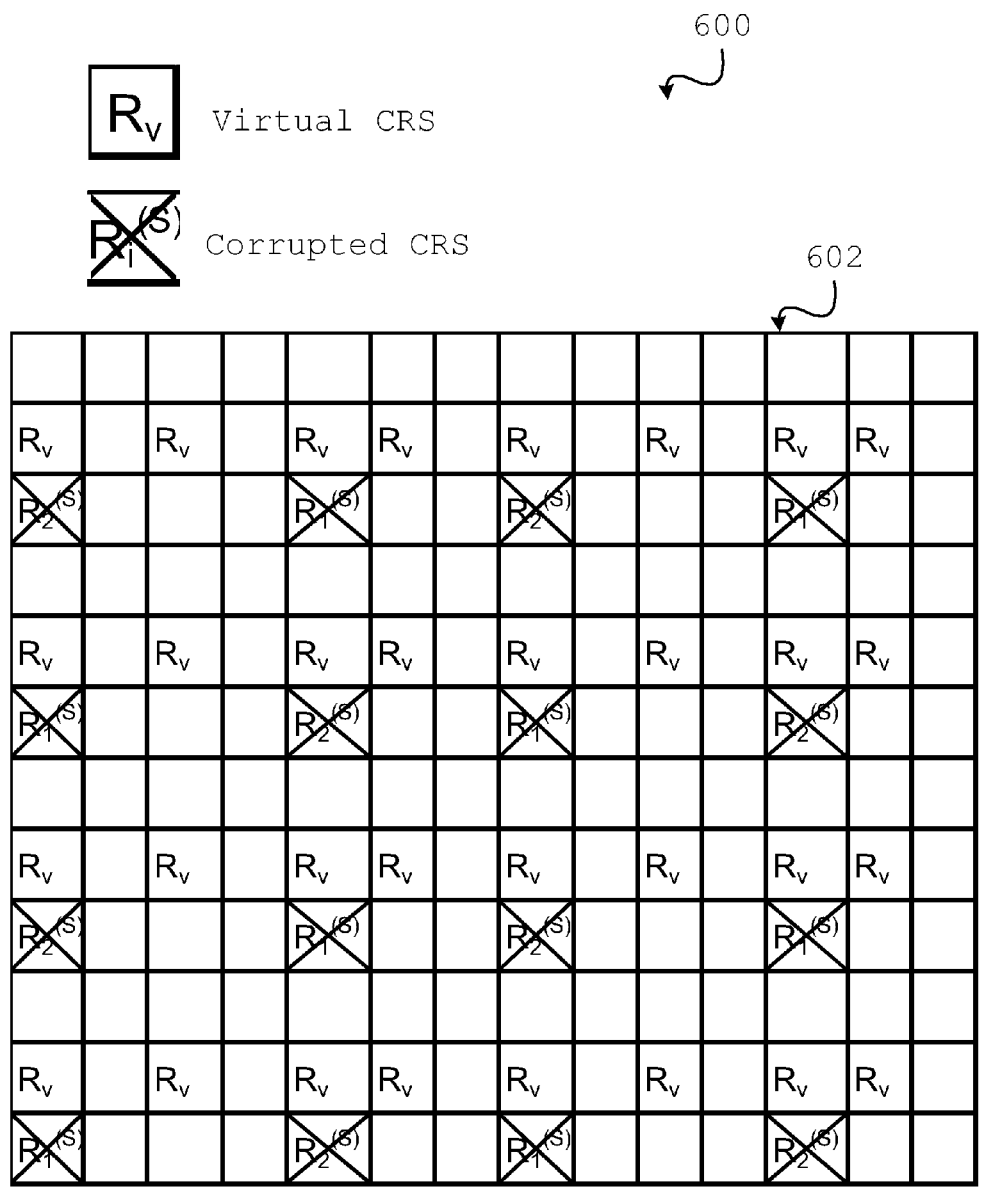
FIG. 6 shows a time-frequency resource grid in accordance with an illustrative embodiment.

FIG. 6 shows a time-frequency resource grid in accordance with an illustrative embodiment.

The time-frequency resource grid 602 may be examples of time-frequency resource grid of user equipment in communication system. In an embodiment, to keep computational complexity low, specific (instead of all available) data can be selected for the DDCE. For example, the data in every two OFDM symbols along subcarriers can be chosen according to the pilot patterns shown in this figure. In other words, data at subcarrier index "k" is selected if mod(k+$k_0$+1,3)=0, where $k_0$ denotes the CRSs offset for current subframe. The selected data is called the virtual CRSs. The virtual CRSs may be selected such that they are, roughly, uniformly distributed in the time-frequency resource grid and/or according to the decision quality. In this embodiment, high estimation accuracy can be obtained.

Figure 7:
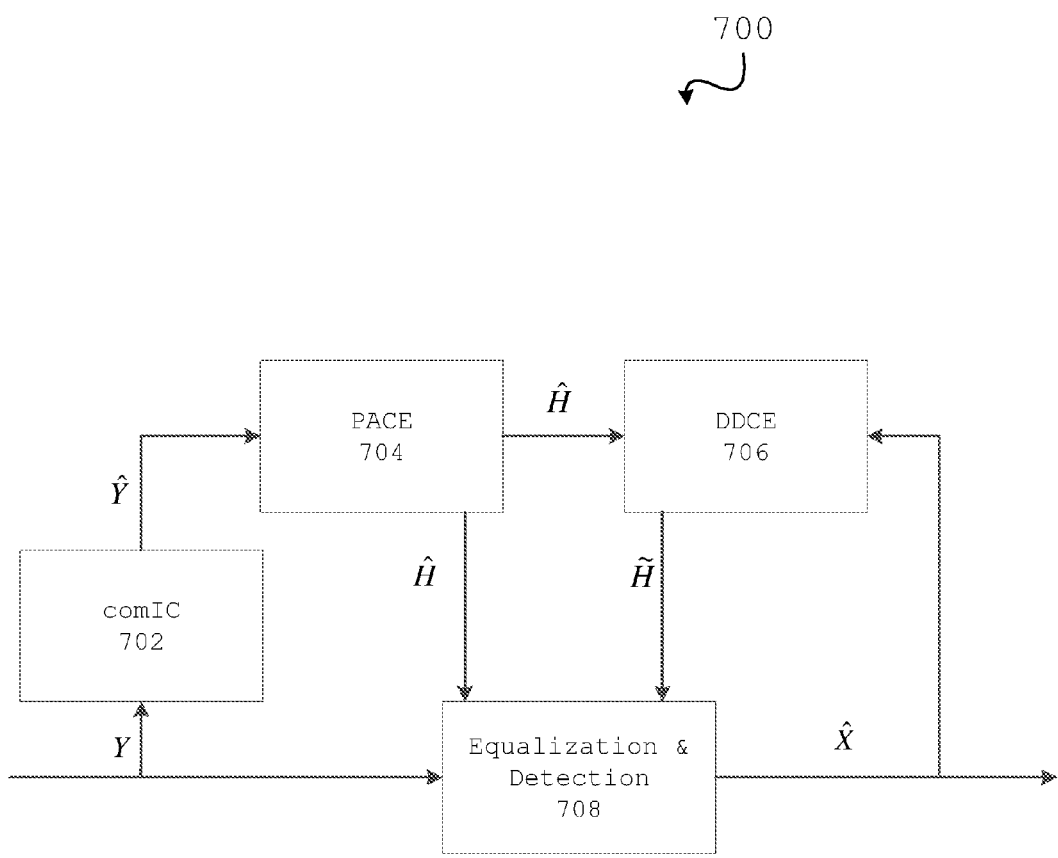
FIG. 7 is a flowchart for an IC-assisted decision-directed channel estimation in accordance with an illustrative embodiment.

FIG. 7 is a flowchart for an IC-assisted decision-directed channel estimation in accordance with an illustrative embodiment. Process 700 may be used in a communication system, such as communication system 100 as shown in FIG. 1.

In an embodiment, a method is provided for an IC-assisted DDCE scheme (IC+DDCE), which exploits the advantages of both the scheme 'comIC' and 'DDCE'. In this figure, $\hat{X}$ denotes the detected data.

The received-power dependent or combined IC scheme, as shown in FIG. 5, is first employed (step 702). Then, an initial channel estimate $\hat{H}$ is computed by PACE (pilot-assisted channel estimation) using the CRSs according to the MMSE or the maximum likelihood criterion (step 704). Finally, the initial channel estimate $\hat{H}$ is used by DDCE for data detection (step 706).

For an N×M MIMO system, new channel coefficients $\tilde{H}_{m,ij}$ can be estimated based on the detected symbols and the channel estimate $\hat{H}$ as follows $$\tilde{H}_{m,ij}=(Y_{m,i}-\Sigma_{q=1,q\neq j}^{M}\hat{H}_{m,ij}\hat{X}_{m,q})/\hat{X}_{m,j}, i\in[1,N], j\in[1,M] \quad (12)$$

$\tilde{H}_{ij}$ is referred to as the raw channel estimate. Again, Wiener filtering can then be used to further reduce the noise.

Note that for the DDCE, the correct data detection (step 708) in the first stage plays an important role. In case the bit error rate (BER) from the first decoding is large, e.g. BER>10%, the second stage DDCE may degrade the performance of the first stage. When adaptive modulation and coding (AMC) is enabled, this scheme can achieve a 10% block error rate (BLER).

Figure 8:
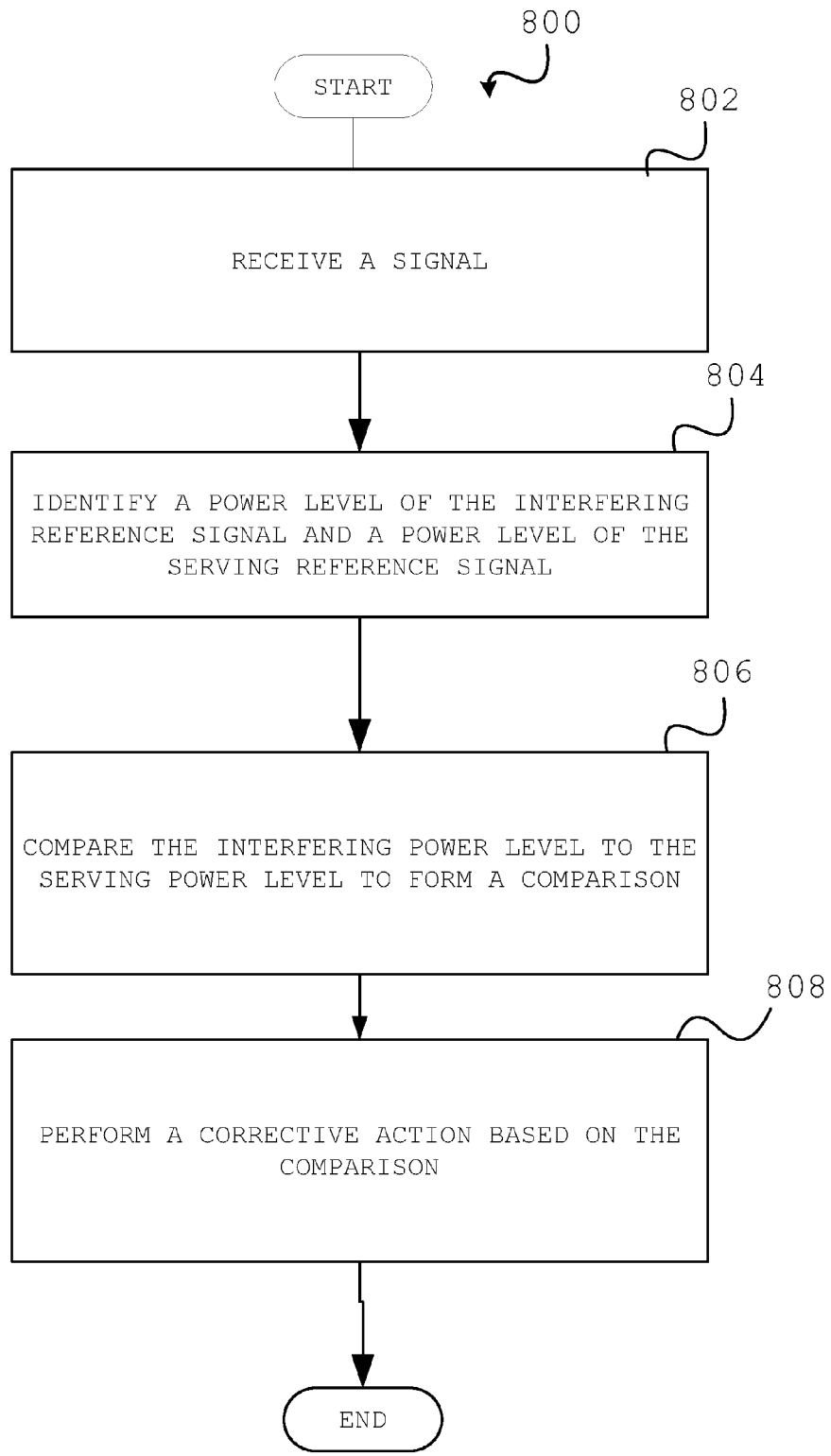
FIG. 8 is a flowchart for managing signal interference in accordance with an illustrative embodiment.

FIG. 8 is a flowchart for managing signal interference in accordance with an illustrative embodiment. Process 800 may be used in a communication system, such as communication system 100 as shown in FIG. 1.

In an embodiment, the process begins with receiving a signal (step 802). The signal may comprise at least an interfering reference signal from an interfering network interface and a serving reference signal from a serving network interface. Also, the interfering signal may interfere with the serving signal. In one or more embodiments, the interfering power level and the serving power level may each be reference signal received power measurements.

Next, a detection module may identify a power level of the interfering reference signal and a power level of the serving reference signal (step 804). Then, the detection module may compare the interfering power level to the serving power level to form a comparison (step 806).

Finally, a estimator module may perform a corrective action based on the comparison (step 808). In one or more embodiments, performing a corrective action may include estimating a channel of at least one of the interfering network interface and the serving network interface. Also, in one or more embodiments, performing a corrective action may include subtracting the interfering reference signal from the signal.

Figure 9:
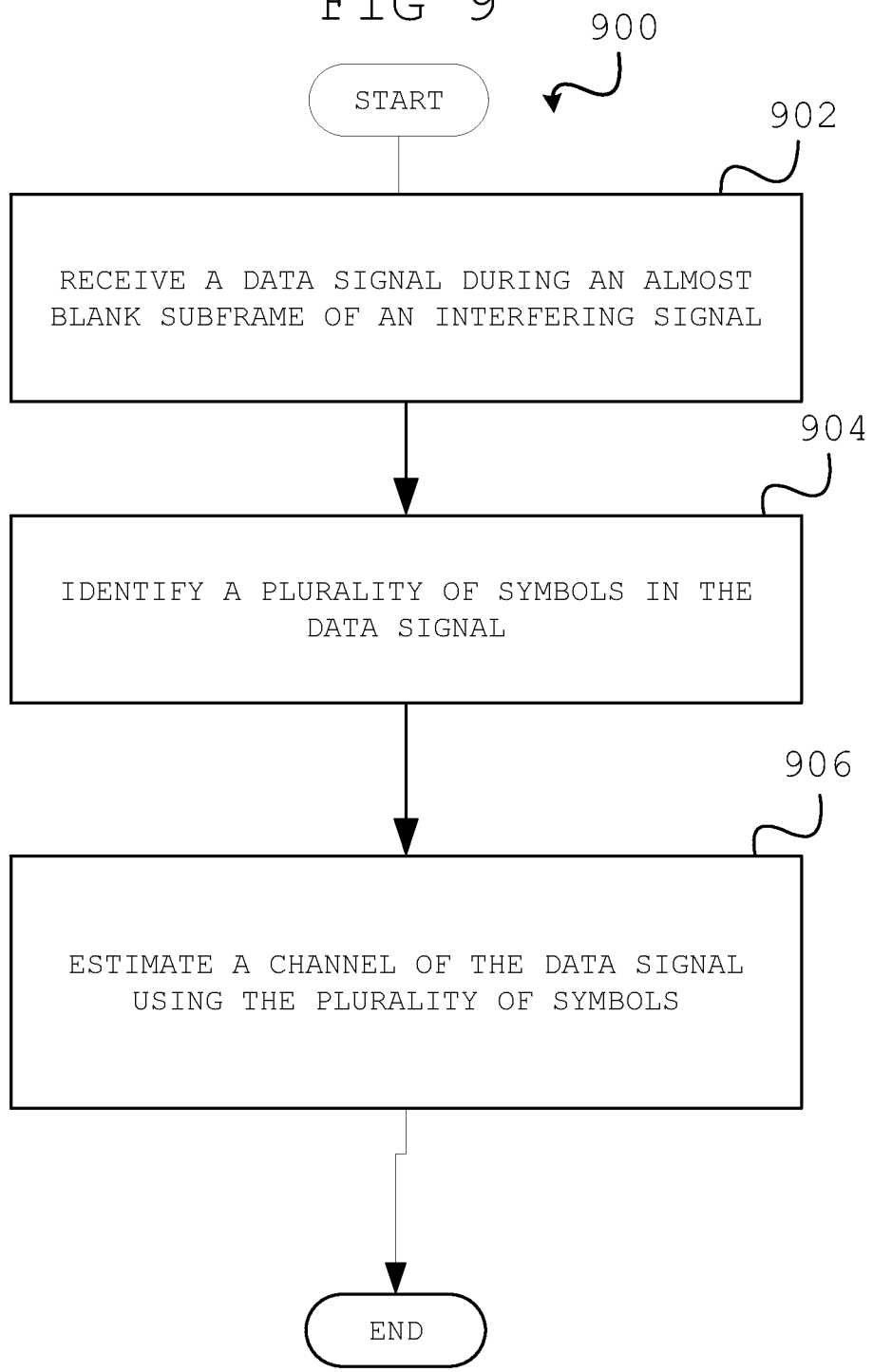
FIG. 9 is a flowchart for managing signal interference in accordance with an illustrative embodiment.

FIG. 9 is a flowchart for managing signal interference in accordance with an illustrative embodiment. Process 900 may be used in a communication system, such as communication system 100 as shown in FIG. 1.

In an embodiment, the process begins with receiving a data signal during an almost blank subframe of an interfering signal (step 902). In one or more embodiments, the data signal may be demodulated.

Next, a detector module may identify a plurality of symbols in the data signal (step 904). The plurality of symbols are at least one or more symbols apart. Also, the plurality of symbols may be within the same subcarrier. Furthermore, the data signal may be from a serving cell.

Then, an estimator module may estimate a channel of the data signal using the plurality of symbols (step 906). Thereafter, the process terminates. In another embodiment, the process may use process 800 instead of step 902. Then, the plurality of symbols are taken from the result of the corrective action.

Figure 10:
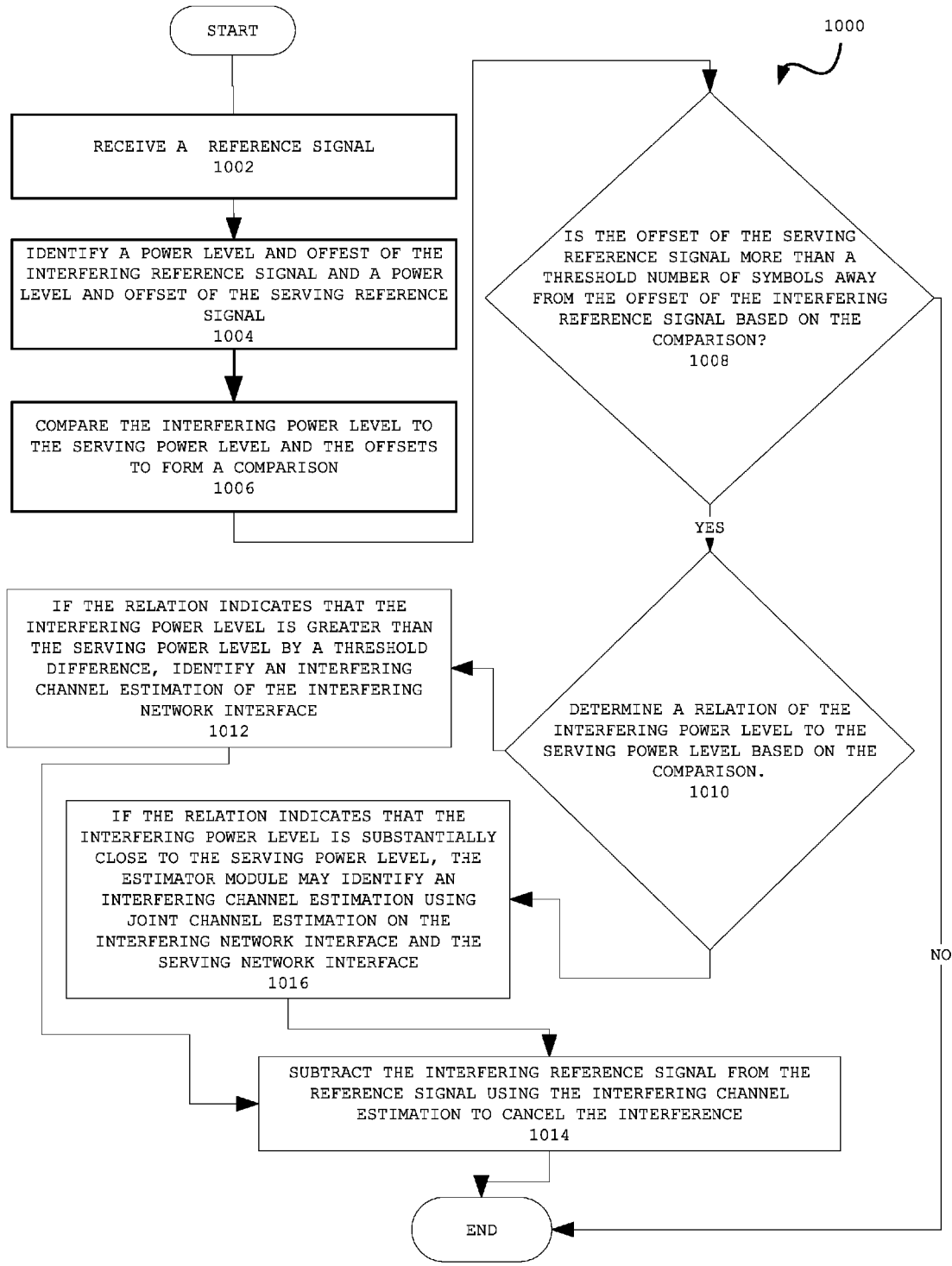
FIG. 10 is a flowchart for managing signal interference in accordance with an illustrative embodiment.

FIG. 10 is a flowchart for managing signal interference in accordance with an illustrative embodiment. Process 1000 may be used in a communication system, such as communication system 100 as shown in FIG. 1.

In an embodiment, the process begins with receiving a reference signal (step 1002). The signal may comprise at least an interfering reference signal from an interfering network interface and a serving reference signal from a serving network interface. Also, the interfering signal may interfere with the serving signal. In one or more embodiments, the interfering power level and the serving power level may each be reference signal received power measurements.

Next, a detection module may identify a power level and offset of the interfering reference signal and a power level and offset of the serving reference signal (step 1004). Then, the detection module may compare the interfering power level to the serving power level and the offsets to form a comparison (step 1006). In an embodiment, comparing identifies the relation of the power levels to each other and the offsets to each other. The comparison may be stored in memory and may include data on the signals, thee power levels of the signals, and the offsets of the signals.

Next, a detection module may determine whether the offset of the serving reference signal is more than a threshold number of symbols away from the offset of the interfering reference signal based on the comparison (step 1008).

If the offset of the serving reference signal is more than the threshold number of symbols away from the offset of the interfering reference signal, the process terminates. If the offset of the serving reference signal is not more than the threshold number of symbols away from the offset of the interfering reference signal, the detection module determines a relation of the interfering power level to the serving power level based on the comparison (step 1010).

If the relation indicates that the serving power level is greater than the interfering power level by a threshold difference, the process terminates. If the relation indicates that the interfering power level is greater than the serving power level by a threshold difference, the estimator module may identify an interfering channel estimation of the interfering network interface (step 1012).

Then, the estimator module may subtract the interfering reference signal from the reference signal using the interfering channel estimation to cancel the interference (step 1014).

Also, if the relation in step 1010 indicates that the interfering power level is substantially close to the serving power level, the estimator module may identify an interfering channel estimation using joint channel estimation on the interfering network interface and the serving network interface (step 1016). In an embodiment, the serving channel of the serving network interface may already be known from joint detection. Next, the estimator module may move to step 1014 and subtract the interfering reference signal from the reference signal using the interfering channel estimation to cancel the interference. Herein, substantially close may mean a number of different ranges. For example, in an embodiment, substantially close may mean within 3 dB. In another embodiment, it may mean within 5 dB. Substantially close may be any range that is witting the threshold difference as used above. Thereafter, the process terminates.

The flowcharts and block diagrams in the different depicted aspects illustrate the architecture, functionality, and operation of some possible implementations of apparatus, methods, system, and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

In an embodiment, a method is provided for managing signal interference. The method comprises receiving a reference signal comprising at least an interfering reference signal from an interfering network interface and a serving reference signal from a serving network interface, and the interfering reference signal interferes with the serving reference signal; identifying a power level and offset of the interfering reference signal and a power level and offset of the serving reference signal; and comparing the interfering power level and offset to the serving power level and offset to form a comparison.

In an embodiment, the method comprises performing a corrective action based on the comparison.

In an embodiment, the interfering power level and the serving power level are each reference signal received power measurements.

In an embodiment, the interfering network interface is an interfering cell, and wherein the serving network interface is a serving cell.

In an embodiment, the method comprises, responsive to the interfering power level being greater than the serving power level by a threshold difference based on the comparison, subtracting the interfering reference signal from the reference signal.

In an embodiment, the method comprises, responsive to the interfering power level being greater than the serving power level by a threshold difference based on the comparison, estimating a channel of at least one of the interfering network interface and the serving network interface.

In an embodiment, the method comprises determining whether the offset of the serving reference signal is more than a threshold number of symbols away from the offset of the interfering reference signal; and responsive to the offset of the serving reference signal not being more than the threshold number of symbols away from the offset of the interfering reference signal, determining a relation of the interfering power level to the serving power level based on the comparison.

In an embodiment, the method comprises determining whether the offset of the serving reference signal is more than a threshold number of symbols away from the offset of the interfering reference signal; and responsive to the offset of the serving reference signal being more than the threshold number of symbols away from the offset of the interfering reference signal, performing the corrective action comprises not performing the corrective action.

In an embodiment, the method comprises, responsive to the relation indicating that the interfering power level is greater than the serving power level by a threshold difference, identifying an interfering channel estimation of the interfering network interface.

In an embodiment, the method comprises subtracting the interfering reference signal from the reference signal using the interfering channel estimation to cancel the interference.

In an embodiment, the method comprises, responsive to the relation indicating that the interfering power level is less than the serving power level by a threshold difference, performing no corrective action.

In an embodiment, the method comprises, responsive to the relation indicating that the interfering power level is substantially close to the serving power level based on the comparison, identifying an interfering channel estimation using joint channel estimation on the interfering network interface and the serving network interface; and subtracting the interfering reference signal from the reference signal using the interfering channel estimation to cancel the interference.

In an embodiment, a method for managing signal interference is provided. The method comprises identifying a plurality of symbols in a demodulated data signal, the plurality of symbols are at least one or more symbols apart; and estimating a channel of the demodulated data signal using the plurality of symbols.

In an embodiment, the plurality of symbols are within the same subcarrier.

In an embodiment, the demodulated data signal is from a serving cell.

In an embodiment, the method comprises receiving the demodulated data signal during an almost blank subframe of an interfering signal.

In an embodiment, the method comprises receiving a reference signal, the reference signal comprising at least an interfering reference signal from an interfering network interface and a serving reference signal from a serving network interface, and the interfering reference signal interferes with the serving reference signal; identifying a power level and offset of the interfering reference signal and a power level and offset of the serving reference signal; determining whether the offset of the serving reference signal is more than a threshold number of symbols away from the offset of the interfering reference signal; responsive to the offset of the serving reference signal not being more than the threshold number of symbols away from the offset of the interfering reference signal, determining a relation of the interfering power level to the serving power level; responsive to the relation indicating that the interfering power level is substantially close to the serving power level, identifying an interfering channel estimation using joint channel estimation on the interfering network interface and the serving network interface; and subtracting the interfering reference signal from the reference signal using the interfering channel estimation to cancel the interference and form the demodulated data signal.

In an embodiment, user equipment is provided. The user equipment comprising a receiver configured to receive a reference signal, the reference signal comprising at least an interfering reference signal from an interfering network interface and a serving reference signal from a serving network interface, and the interfering reference signal interferes with the serving reference signal; and a detector module configured to identify a power level and offset of the interfering reference signal and a power level and offset of the serving reference signal and compare the interfering power level and offset to the serving power level and offset.

In an embodiment, the user equipment comprises, responsive to the power level of the interfering reference signal being greater than the power lever of the serving signal by a threshold difference, subtracting the interfering reference signal from the reference signal.

In an embodiment, the user equipment comprises, responsive to the power level of the interfering reference signal being greater than the power lever of the serving signal by a threshold difference, estimating a channel of at least one of the interfering network interface to form a channel estimation.

In an embodiment, the user equipment comprises, subtracting the channel estimation from the reference signal.

In an embodiment, user equipment is provided. The user equipment comprises a detector module configured to identify a plurality of symbols in a demodulated data signal, the plurality of symbols are at least one or more symbols apart; and an estimator module configured to estimate a channel of the demodulated data signal using the plurality of symbols.

In an embodiment, the plurality of symbols are within the same subcarrier.

In an embodiment, the demodulated data signal is from a serving cell.

In an embodiment, the user equipment comprises a receiver module configured to receive the demodulated data signal during an almost blank subframe of an interfering signal.

In an embodiment, the user equipment comprises receiving a reference signal, the reference signal comprising at least an interfering reference signal from an interfering network interface and a serving reference signal from a serving network interface, and the interfering reference signal interferes with the serving reference signal; identifying a power level and offset of the interfering reference signal and a power level and offset of the serving reference signal; determining whether the offset of the serving reference signal is more than a threshold number of symbols away from the offset of the interfering reference signal; responsive to the offset of the serving reference signal not being more than the threshold number of symbols away from the offset of the interfering reference signal, determining a relation of the interfering power level to the serving power level; responsive to the relation indicating that the interfering power level is substantially close to the serving power level, identifying an interfering channel estimation using joint channel estimation on the interfering network interface and the serving network interface; and subtracting the interfering reference signal from the reference signal using the interfering channel estimation to cancel the interference and form the demodulated data signal.

In an embodiment, a method is provided for managing signal interference, the method comprising: receiving a reference signal comprising at least an interfering reference signal from an interfering network interface and a serving reference signal from a serving network interface, and the interfering reference signal interferes with the serving reference signal; identifying an offset of the interfering reference signal and an offset of the serving reference signal; determining whether the offset of the serving reference signal is more than a threshold number of symbols away from the offset of the interfering reference signal; and responsive to the offset of the serving reference signal not being more than the threshold number of symbols away from the offset of the interfering reference signal, determining a relation of the interfering power level to the serving power level.

In an embodiment, a user equipment is provided for managing signal interference. The user equipment comprises a receiver and a detector module. The receiver may be configured to receive a reference signal comprising at least an interfering reference signal from an interfering network interface and a serving reference signal from a serving network interface, and the interfering reference signal interferes with the serving reference signal. The detector module may be configured to identify an offset of the interfering reference signal and an offset of the serving reference signal; determine whether the offset of the serving reference signal is more than a threshold number of symbols away from the offset of the interfering reference signal; and responsive to the offset of the serving reference signal not being more than the threshold number of symbols away from the offset of the interfering reference signal, determine a relation of the interfering power level to the serving power level.

The invention claimed is:

1. A method for managing signal interference, the method comprising:
    receiving a reference signal comprising at least an interfering reference signal from an interfering network interface and a serving reference signal from a serving network interface, and the interfering reference signal interferes with the serving reference signal;
    identifying a power level of the interfering reference signal and a power level of the serving reference signal; and
    comparing the interfering power level to the serving power level to form a comparison;
    wherein the identifying comprises:
    identifying an offset of the interfering reference signal and an offset of the serving reference signal; and
    wherein the comparing comprises:
    determining whether the offset of the serving reference signal is more than a threshold number of symbols away from the offset of the interfering reference signal; and
    responsive to the offset of the serving reference signal not being more than the threshold number of symbols away from the offset of the interfering reference signal, determining a relation of the interfering power level to the serving power level based on the comparison.

2. The method of claim 1, further comprising:
    performing a corrective action based on the comparison.

3. The method of claim 1, wherein the interfering power level and the serving power level are each reference signal received power measurements.

4. The method of claim 1, wherein the interfering network interface is an interfering cell, and wherein the serving network interface is a serving cell.

5. The method of claim 1, further comprising:
    responsive to the interfering power level being greater than the serving power level by a threshold difference based on the comparison, subtracting the interfering reference signal from the reference signal.

6. The method of claim 1, further comprising:
    responsive to the interfering power level being greater than the serving power level by a threshold difference based on the comparison, estimating a channel of at least one of the interfering network interface and the serving network interface.

7. The method of claim 2, further comprising:
determining whether the offset of the serving reference signal is more than a threshold number of symbols away from the offset of the interfering reference signal;
responsive to the offset of the serving reference signal being more than the threshold number of symbols away from the offset of the interfering reference signal, monitoring the reference signal.

8. The method of claim 1, further comprising:
responsive to the relation indicating that the interfering power level is greater than the serving power level by a threshold difference, identifying an interfering channel estimation of the interfering network interface.

9. The method of claim 8, further comprising:
subtracting the interfering reference signal from the reference signal using the interfering channel estimation to cancel the interference.

10. The method of claim 1, further comprising:
responsive to the relation indicating that the interfering power level is less than the serving power level by a threshold difference, identifying a serving channel estimation of the serving network interface.

11. The method of claim 1, further comprising:
responsive to the relation indicating that the interfering power level is substantially close to the serving power level based on the comparison, identifying an interfering channel estimation using joint channel estimation on the interfering network interface and the serving network interface.

12. A method for managing signal interference, the method comprising:
identifying a plurality of symbols in a demodulated data signal, the plurality of symbols are at least one or more symbols apart;
estimating a channel of the demodulated data signal using the plurality of symbols;
receiving a reference signal, the reference signal comprising at least an interfering reference signal from an interfering network interface and a serving reference signal from a serving network interface, and the interfering reference signal interferes with the serving reference signal;
identifying a power level and offset of the interfering reference signal and a power level and offset of the serving reference signal;
determining whether the offset of the serving reference signal is more than a threshold number of symbols away from the offset of the interfering reference signal;
responsive to the offset of the serving reference signal not being more than the threshold number of symbols away from the offset of the interfering reference signal, determining a relation of the interfering power level to the serving power level;
responsive to the relation indicating that the interfering power level is substantially close to the serving power level, identifying an interfering channel estimation using joint channel estimation on the interfering network interface and the serving network interface; and
subtracting the interfering reference signal from the reference signal using the interfering channel estimation to cancel the interference and form the demodulated data signal.

13. The method of claim 12, wherein the plurality of symbols are within the same subcarrier.

14. The method of claim 12, wherein the demodulated data signal is from a serving cell.

15. The method of claim 12, further comprising:
receiving the demodulated data signal during an almost blank subframe of an interfering signal.

16. A user equipment, comprising:
a receiver configured to receive a reference signal, the reference signal comprising at least an interfering reference signal from an interfering network interface and a serving reference signal from a serving network interface, and the interfering reference signal interferes with the serving reference signal; and
a detector module configured to identify a power level of the interfering reference signal and a power level of the serving reference signal by identifying an offset of the interfering reference signal and an offset of the serving reference signal, configured to compare the interfering power level to the serving power level by determining whether the offset of the serving reference signal is more than a threshold number of symbols away from the offset of the interfering reference signal, and further configured to determine a relation of the interfering power level to the serving power level based on the comparison if the offset of the serving reference signal is more than a threshold number of symbols away from the offset of the interfering reference signal.

17. The user equipment of claim 16, further comprising:
responsive to the power level of the interfering reference signal being greater than the power lever of the serving signal by a threshold difference, subtracting the interfering reference signal from the reference signal.

18. The user equipment of claim 16, further comprising:
responsive to the power level of the interfering reference signal being greater than the power lever of the serving signal by a threshold difference, estimating a channel of at least one of the interfering network interface to form a channel estimation.

* * * * *